United States Patent

Buchanan, Jr. et al.

[11] Patent Number: 5,669,986
[45] Date of Patent: Sep. 23, 1997

[54] REPLENISHMENT OF VEHICLE WINDSHIELD WASHER SOLVENT USING RAINWATER

[75] Inventors: Harry C. Buchanan, Jr., Spring Valley; Jeffrey J. Buschur, Bellbrook, both of Ohio

[73] Assignee: ITT Automotive Electrical Systems, Inc., Auburn Hills, Mich.

[21] Appl. No.: 486,685

[22] Filed: Jun. 7, 1995

[51] Int. Cl.$^6$ ........................................ B60S 1/46
[52] U.S. Cl. ................. 134/42; 15/97.1; 15/97.3; 15/103; 134/18; 134/123; 134/198; 239/284.1; 296/96.15
[58] Field of Search ............................ 134/2, 18, 42, 134/56 R, 57 R, 58 R, 60, 104.1, 104.2, 109, 110, 123, 198, 201; 15/97.1, 97.3, 103, 250.001, 250.01, DIG. 15; 296/96.15; 220/562; 239/284.1

[56] References Cited

U.S. PATENT DOCUMENTS

| | | |
|---|---|---|
| 2,187,117 | 1/1940 | Faulkner . |
| 3,738,575 | 6/1973 | Somer ................. 239/284 |
| 3,792,506 | 2/1974 | Rouse ................. 15/250.03 |
| 3,987,295 | 10/1976 | Vena . |
| 4,010,383 | 3/1977 | Grassmann ............ 307/118 |
| 4,527,106 | 7/1985 | Fischer ................. 318/483 |
| 4,567,412 | 1/1986 | Graham ................. 318/483 |
| 4,639,831 | 1/1987 | Iyoda ..................... 361/286 |
| 4,705,998 | 11/1987 | Millerd et al. ........... 318/444 |
| 4,710,878 | 12/1987 | Iyoda ..................... 364/424 |
| 4,797,605 | 1/1989 | Palanisamy ............. 324/65 R |
| 4,805,070 | 2/1989 | Koontz et al. ........... 361/286 |
| 4,831,493 | 5/1989 | Wilson et al. ........... 361/286 |
| 5,040,411 | 8/1991 | Medzius .................. 73/73 |
| 5,140,234 | 8/1992 | Wallrafen ............... 318/264 |
| 5,141,160 | 8/1992 | Waters .................. 15/250.01 |
| 5,157,314 | 10/1992 | Kuhbauch ............... 318/443 |
| 5,304,936 | 4/1994 | Buschur ................. 324/689 |
| 5,327,613 | 7/1994 | Ohtsu .................. 15/250.02 |
| 5,407,091 | 4/1995 | Wallis .................. 220/565 |

FOREIGN PATENT DOCUMENTS

| | | | |
|---|---|---|---|
| 4101820 | 7/1992 | Germany ............ B60S 1/46 |
| 4107475 | 9/1992 | Germany ............ B60S 1/46 |
| 9209840 | 11/1992 | Germany ............ B60S 1/48 |
| 5238357 | 2/1992 | Japan ............... B60S 1/50 |

*Primary Examiner*—Jill Warden
*Assistant Examiner*—Jan M. Ludlow
*Attorney, Agent, or Firm*—J. Gordon Lewis; Thomas N. Twomey

[57] ABSTRACT

Under the invention, collection surfaces are provided in a vehicle. The invention uses the collection surfaces to collect rainwater for a windshield washing system. The collection surfaces become contaminated by agents such as road salt. The invention uses initial rainwater to flush the collection surfaces, and discards this initial rainwater. Then, the invention uses the flushed surfaces to collect subsequent rainwater.

3 Claims, 12 Drawing Sheets

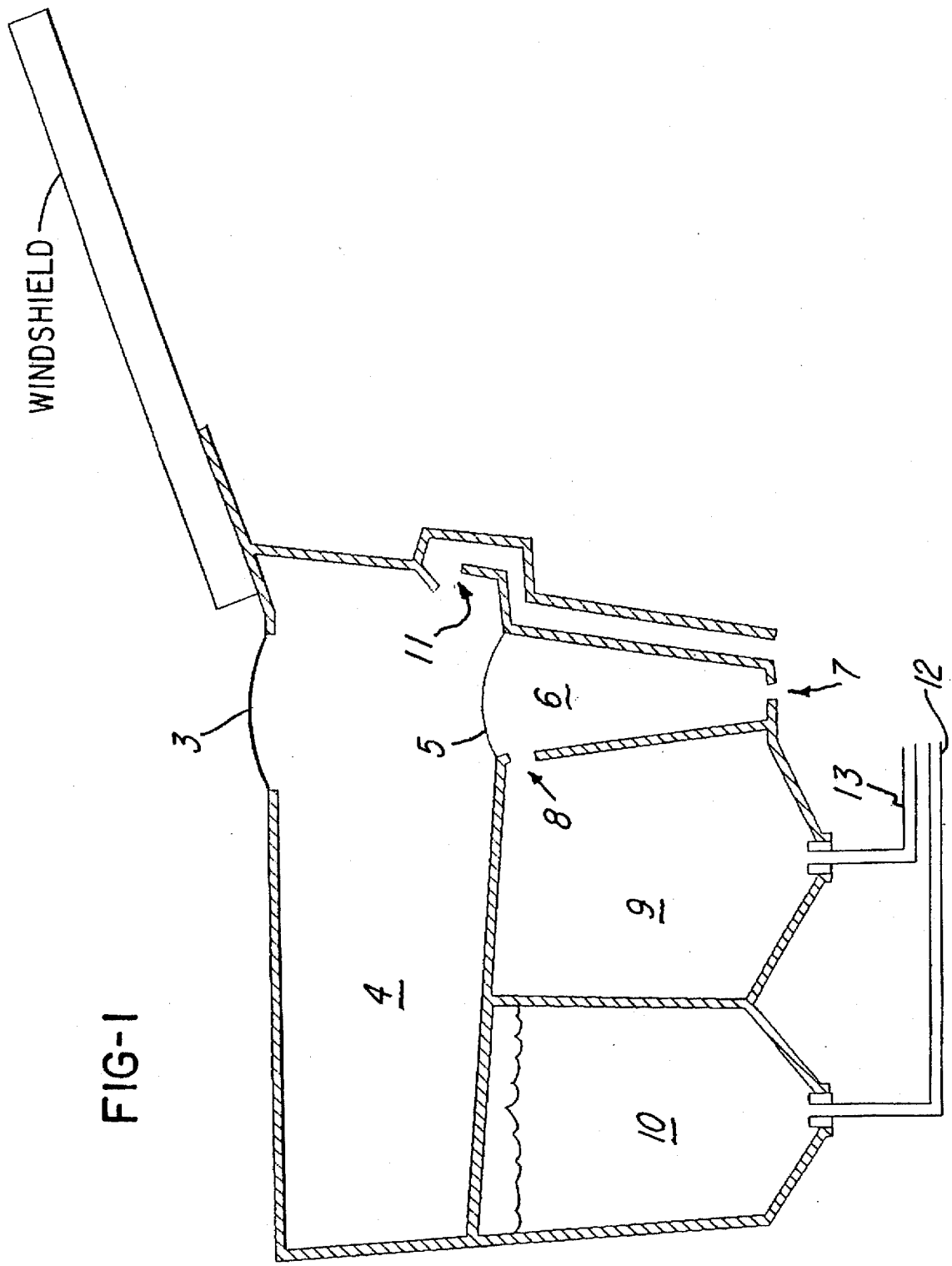

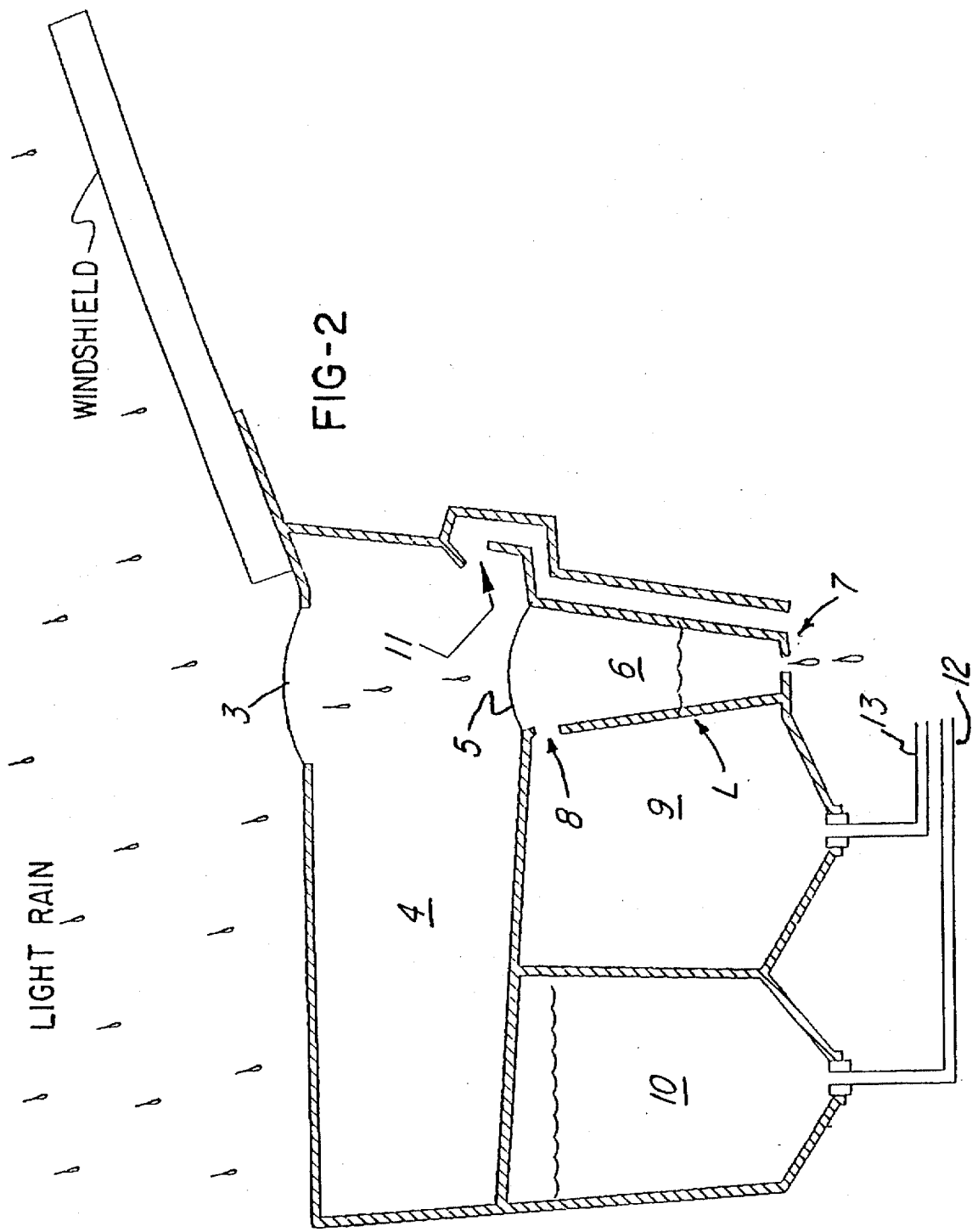

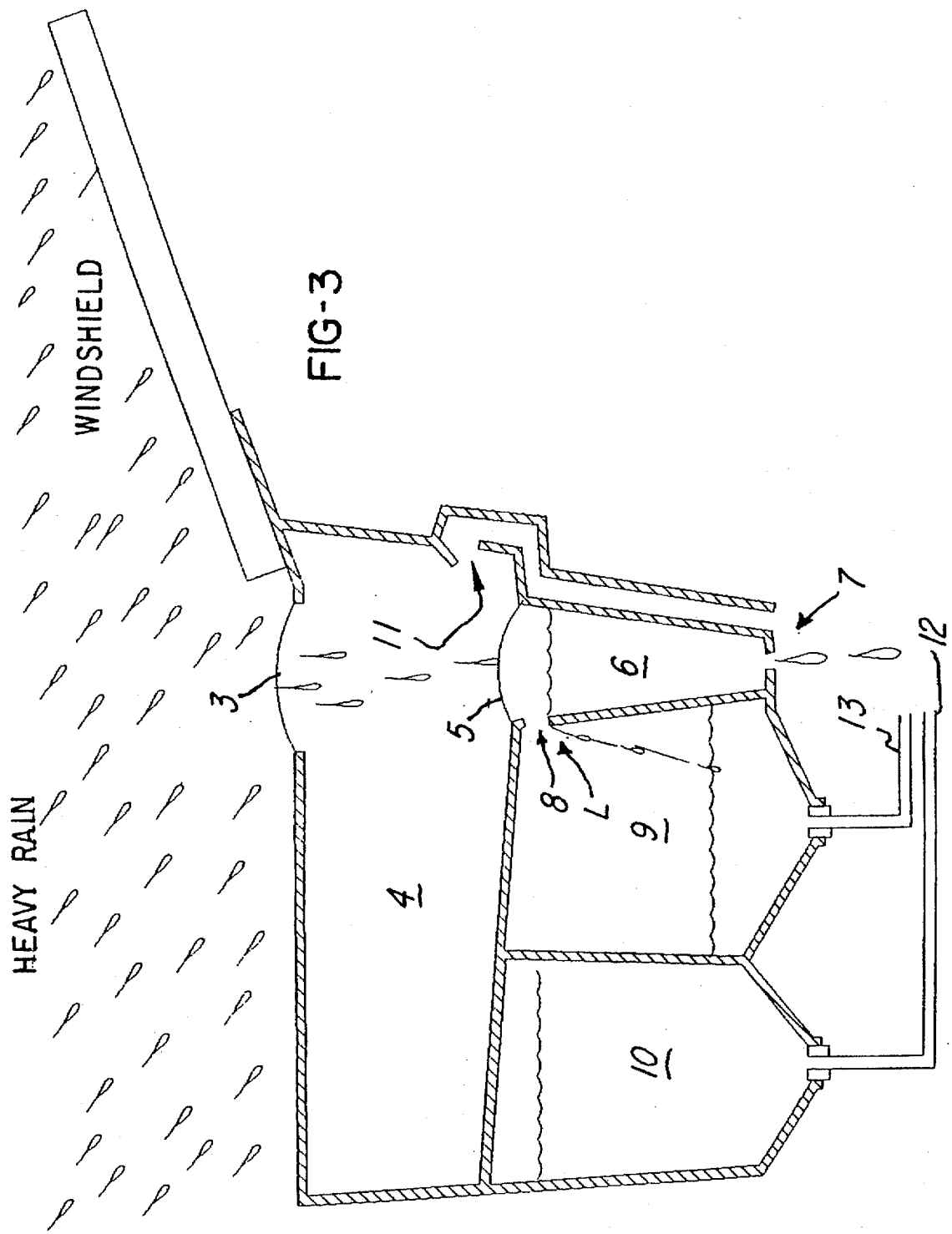

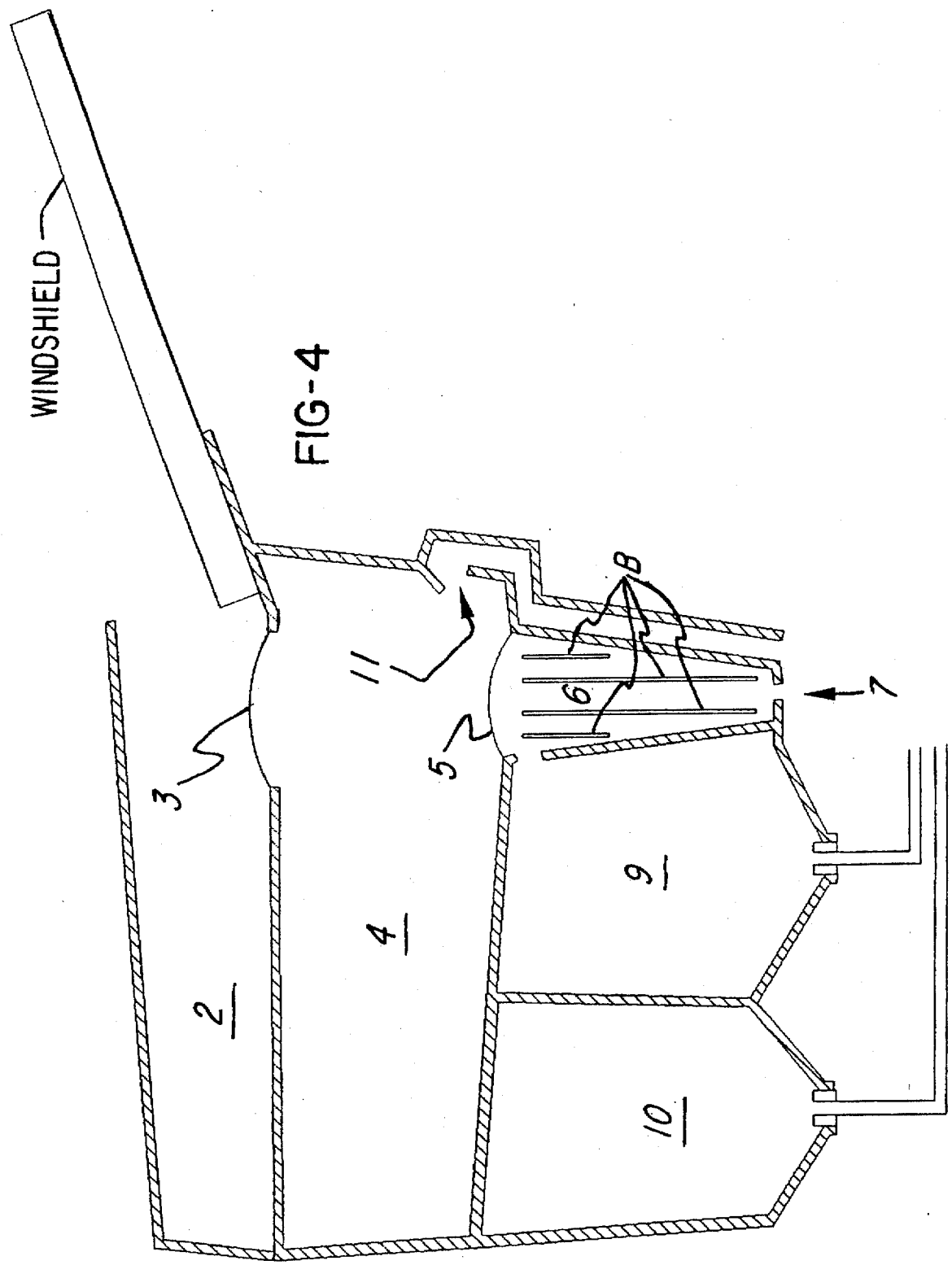

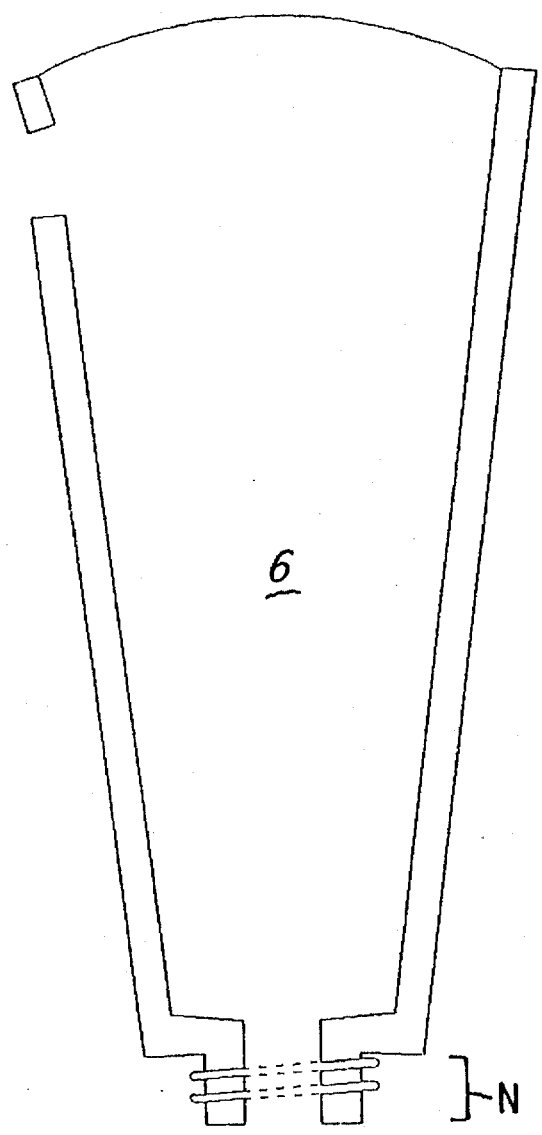
FIG-6
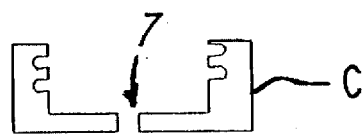
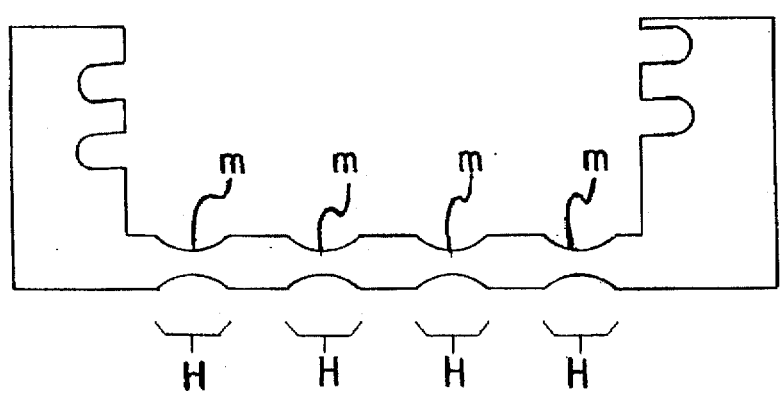
FIG-7

| Interval # | Interval Time | Interval Rate | Rain per Interval in One Year | Cum Rain @ 0 Bypass | Stored Water @ 3mm/hr Bypass |
|---|---|---|---|---|---|
| 1  0 - .001% | .087 hrs | 102+mm/hr | 8.87mm | 8.87mm | 8.61mm |
| 2  .001-.002 | .087 | 94 | 8.18 | 17.05 | 16.53 |
| 3  .002-.005 | .263 | 75 | 19.73 | 36.78 | 35.47 |
| 4  .005-.01 | .438 | 57 | 24.97 | 61.75 | 59.12 |
| 5  .01-.02 | .876 | 42 | 36.79 | 98.54 | 93.28 |
| 6  .02-.05 | 2.628 | 29 | 76.21 | 174.75 | 161.60 |
| 7  .05-.10 | 4.380 | 19 | 83.22 | 257.97 | 231.69 |
| 8  .10-.20 | 8.760 | 12 | 105.12 | 363.09 | 319.53 |
| 9  .20-.50 | 26.280 | 7.1 | 186.59 | 549.68 | 418.28 |
| 10  .50-1.00 | 43.800 | 4.1 | 179.58 | 729.26 | 486.46 |
| 11  1.00-2.00 | 87.60 | 2.4 | 210.24 | 939.50 | — |

FIG-10A

| | STORED WATER @ 5.0mm/hr Bypass | STORED WATER @ 9.00mm/hr Bypass | STORED WATER @15mm/hr Bypass | STORED WATER @22mm/hr Bypass | STORED WATER @35mm/hr Bypass |
|---|---|---|---|---|---|
| 1 | 8.44mm | 8.09 | 7.57 | 6.96 | 5.23 |
| 2 | 16.18 | 15.49 | 14.44 | 13.22 | 10.95 |
| 3 | 34.59 | 32.85 | 30.22 | 27.16 | 21.48 |
| 4 | 57.37 | 53.87 | 48.62 | 42.49 | 31.12 |
| 5 | 89.78 | 82.78 | 72.27 | 60.01 | 37.25 |
| 6 | 152.85 | 135.33 | 109.06 | 78.41 | — |
| 7 | 214.17 | 179.14 | 126.58 | — | — |
| 8 | 275.49 | 205.24 | — | — | — |
| 9 | 330.68 | — | — | — | — |
| 10 | — | — | — | — | — |
| 11 | — | — | — | — | — |

FIG-10B

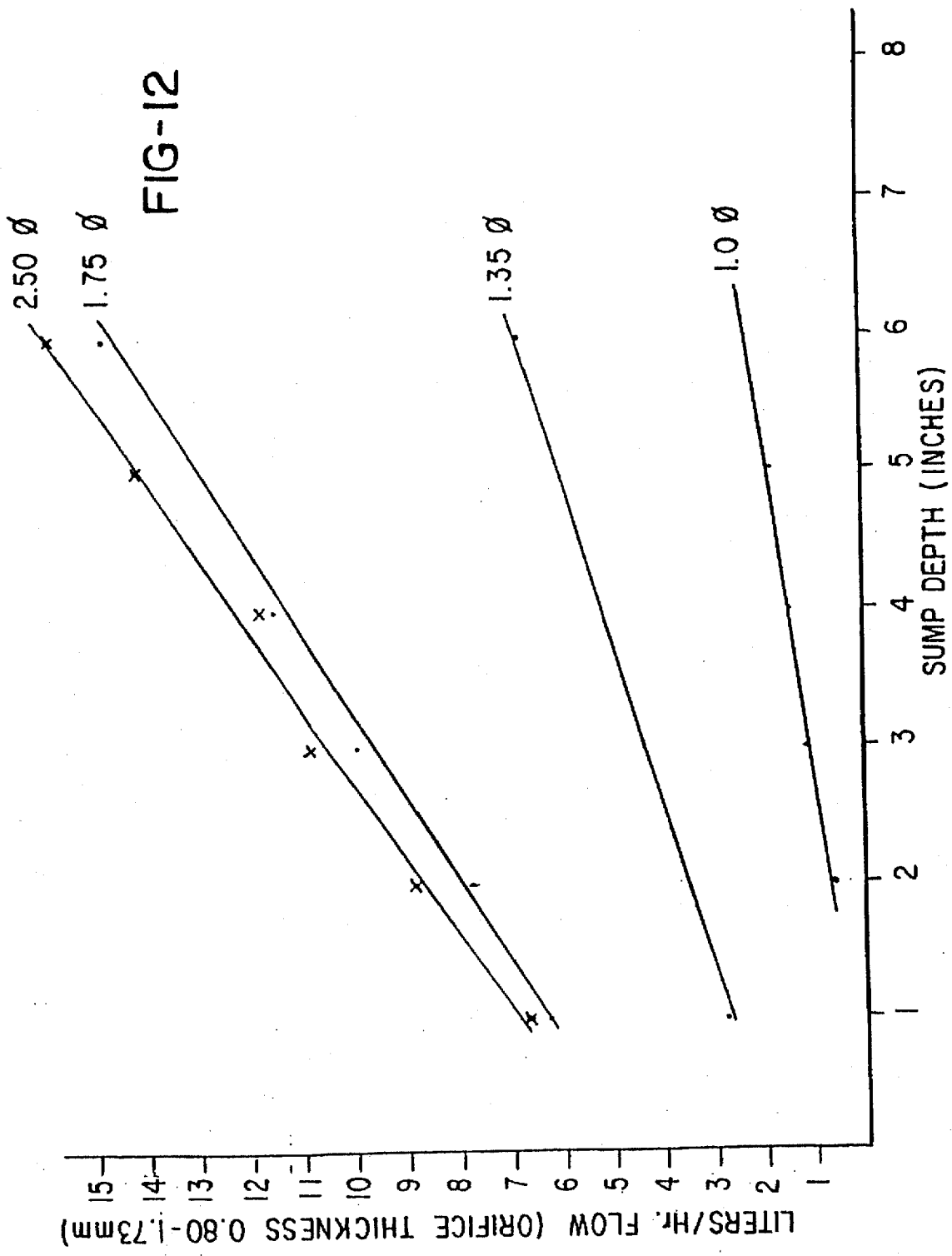

REPLENISHMENT OF VEHICLE WINDSHIELD WASHER SOLVENT USING RAINWATER

The invention concerns capturing rainwater to replenish solvent used in windshield washers for vehicles.

BACKGROUND OF THE INVENTION

Motor vehicles are commonly equipped with automatic windshield washers, which spray a detergent onto the windshield, while the moving windshield wipers scrub away debris.

After repeated washings, the supply of solvent eventually becomes depleted, and must be replenished.

The invention captures rainwater, and uses the captured rainwater to replenish the solvent.

OBJECTS OF THE INVENTION

An object of the invention is to provide an improved windshield washer system in a vehicle.

A further object of the invention is to provide a system for capturing rainwater in a vehicle, for later use in a windshield washing system.

SUMMARY OF THE INVENTION

In one form of the invention, rainwater is used for two purposes. One, it is used to clean collection surfaces, which have been contaminated with agents such as road salt. Two, after the cleaning, rainwater is collected, using the now-clean surfaces, for storage in a reservoir, for later use in windshield washing.

BRIEF DESCRIPTION OF THE DRAWINGS

FIG. 1 illustrates one form of the invention.

FIG. 2 illustrates one form of the invention, in operation in light rain.

FIG. 3 illustrates one form of the invention, in operation in heavy rain.

FIG. 4 illustrates baffles which reduce agitation within sump 6 in FIGS. 1—3.

FIG. 6 illustrates a removable cap C having an aperture A, which attaches to the sump 6.

FIG. 7 illustrates an entry plenum which can be added.

FIGS. 10A and 10B are computations, based on FIG. 9, and on bleeding characteristics of aperture 7 in FIGS. 1–3.

FIG. 12 illustrates flow rates for various bleed orifices.

DETAILED DESCRIPTION OF THE INVENTION

Figure 5A:
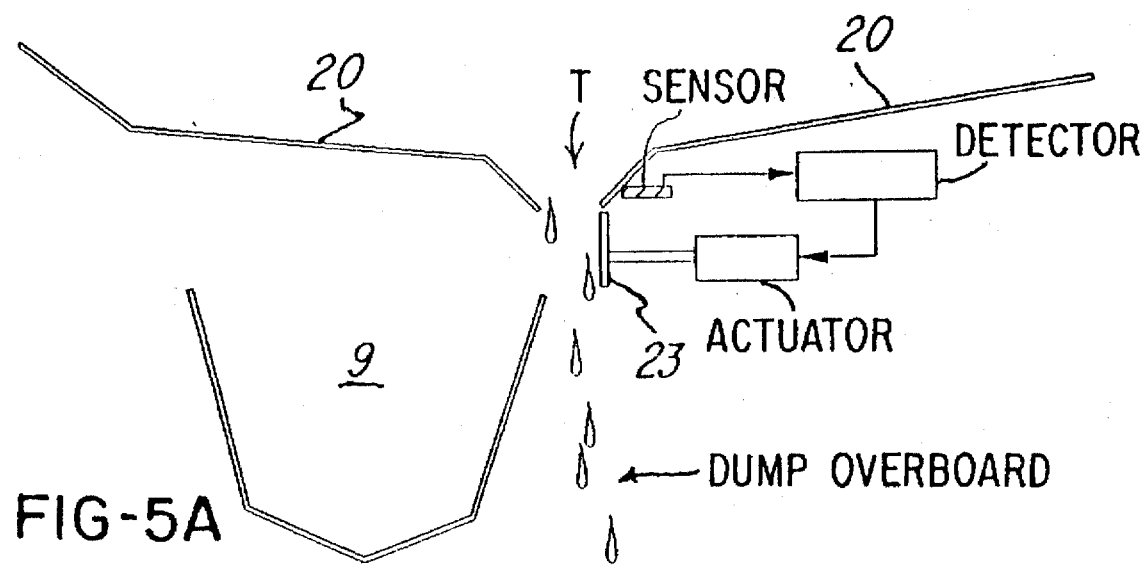
FIG. 5(A–B) illustrates an active system for implementing one form of the invention.

FIG. 1 illustrates one form of the invention. Rainwater runs off a WINDSHIELD, and falls through filtering screens 3 and 5, into a sump 6. When the sump 6 becomes filled, the rainwater spills through entry port 8, and begins to fill reservoir 9.

The initial rainwater will be somewhat contaminated, chiefly by road salt adhering to the WINDSHIELD, and other surfaces which the rainwater contacts. The invention discards this initial, contaminated rainwater.

The invention does so by providing a bleed orifice 7 in the sump 6. This bleed orifice dumps rainwater overboard. However, the bleed orifice 7 is designed so that, when rain becomes heavy enough, the rate of dumping is exceeded by the rate of entry through screen 5, thereby allowing water to accumulate within sump 6. The accumulating water becomes progressively cleaner, because prior water, which was collected in the sump 6, flushed clean the surfaces which the new, incoming water contacts.

When sufficient water accumulates in sump 6, it begins to spill through entry port 8, into reservoir 9. When washing is desired, this water will be mixed with solvent, which is contained in reservoir 10, for cleaning the WINDSHIELD.

FIGS. 2 and 3 will illustrate these concepts in greater detail.

FIG. 2

FIG. 2 illustrates a light rain. If the rate of rainfall is steady, the level L of rainwater contained within sump 6 will remain constant, because the rate of inflow (through screen 5) equals the rate of outflow (through bleed orifice 7). Under these conditions, no rainwater is collected by reservoir 9, because the level L of rainwater within sump 6 does not reach entry port 8.

FIG. 3

FIG. 3 illustrates a heavy rain. The rate of entry of rainwater through screen 5 exceeds the rate of outflow through bleed orifice 7. The level L of rainwater contained within sump 6 rises, and eventually reaches the entry port 8.

During this rise, the rainwater captured by sump 6, which contains contaminants, escapes through the bleed orifice 7. By the time the level L reaches the entry port 8, the rain has sufficiently flushed the capture surfaces, such as the WINDSHIELD, so that the contamination of the rainwater now entering through screen 5 has fallen to acceptable levels.

This low-contamination rainwater spills through entry port 8, and fills the reservoir 9.

When rain becomes excessively heavy, plenum 4 will start to fill, and will overflow through port 11.

Additional Considerations

1. When sump 6 has become filled, and starts overflowing through entry port 8, there will be a concentration gradient of contaminants within sump 6. Near the bottom, contamination will be higher; near the top, it will be lower.

Vehicle motion will tend to agitate the water within sump 6, and tend to mix the high-contaminant water with the low-contaminant water, to thereby distribute the contaminants uniformly throughout the sump. This distribution is not desirable.

Baffles B, shown in FIG. 4, can be added to reduce this agitation. These baffles can take the form of concentric cylinders, which may be perforated. One basic concept behind the baffles is to divide the sump 6 into a multiplicity of tall, thin cells.

Baffle design for such purposes is known in the art. For example, many fuel tanks in vehicles contain baffles, to reduce fluid motion.

2. FIGS. 1–3 show a passive system for rainwater collection. Passive systems generally have the advantage of low cost, and high reliability. However, the passive system does occupy space, which is at a premium in many vehicles, and the passive system also requires material for its construction, which imposes cost.

It may be desirable to implement an active system. One example is shown in FIG. 5A. Collection surfaces 20 are provided, which become contaminated with agents such as road salt. The collection surfaces funnel rainwater to a throat T, where a SENSOR detects resistance of the rainwater. Initial rainwater, having a high salt concentration, has a lower resistance. Later, cleaner, rainwater has a higher resistance.

Figure 5B:
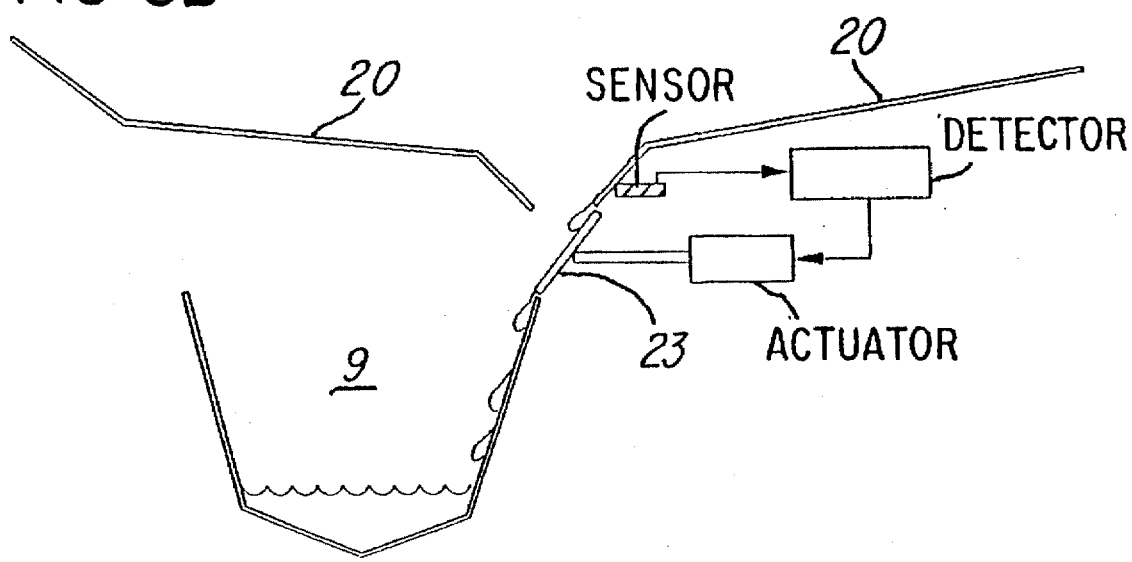

Initial rainwater is dropped overboard, as indicated. When resistance rises above a threshold, a DETECTOR detects the threshold crossing, and actuates a flapper valve 23, using an ACTUATOR, which diverts the rainwater into the reservoir 9, as in FIG. 5B.

The circuitry which performs the resistance detection can be extremely simple, and a single integrated circuit (IC) can be designed to accomplish the detection function. The single IC would mount where the SENSOR is shown. Two pins of the IC would protrude into the cascading rainwater, and measure resistance. (Other parameters can be measured beside resistance. Measuring pH is one possibility.) Other circuitry within the IC would detect the threshold crossing. In large quantities, this IC would be very inexpensive, in the range of five to twenty-five cents.

By using such an inexpensive IC, the major cost of the embodiment shown in FIG. 5 resides in the flapper valve 23. It may be possible to reduce this cost by powering the flapper valve by engine vacuum. Engine vacuum is presently used to actuate flapper valves in the heating and cooling systems of vehicle cabins.

Therefore, one conception of the invention is that it performs the following functions:

a) It provides collection surfaces for rainwater, which become contaminated by road salt.
b) It flushes contaminants from the collection surfaces, using rainwater.
c) After flushing, it collects rainwater, using the collection surfaces. It may begin collection after determining that contaminants have fallen to an acceptable level.

Numerous approaches can be taken to accomplishing these functions, both active and passive.

3. Different geographic regions will perhaps require different amounts of flushing of the collection surfaces, before the rainwater collected becomes sufficiently low in contaminants. Regions where road salt is heavily used provide an example.

Consequently, sump 6 for such regions must pass a larger amount of rainwater, prior to filling reservoir 9. The amount of rainwater passed is determined chiefly by (a) the capacity of the sump and (b) the flow rate of the bleed orifice 7, which, in turn, depends on (i) the fluid head within the sump and (ii) geometry of the orifice, including area-to-circumference ratio.

For the different regions, it may be desirable to manufacture sump 6 with different orifices 7. In addition, if an owner of the invention re-locates to such a region, the owner may wish to change the capture characteristics of orifice 7.

FIG. 6 illustrates one approach to adjusting the orifice 7. A threaded cap C mates with a threaded neck N. Different caps are made available, having orifices 7 of different size.

Alternately, a single cap C having no orifice 7 is provided. The user, or manufacturer, drills an orifice 7 of the proper size.

As another alternate, multiple, concentric, orifices 7 can be provided in the cap C, in the manner of knock-outs in electrical equipment panels. The user removes a suitable number of knock-outs, in order to attain an orifice of the proper size.

As yet another alternate, the cap C can resemble the top of a salt shaker, as in FIG. 7. However, the holes H are not fully formed. They are covered by thin membranes M, as shown. The user, or manufacturer, punctures a suitable number of holes, as by using a scratch awl, to attain the correct aperture size.

Figure 8:
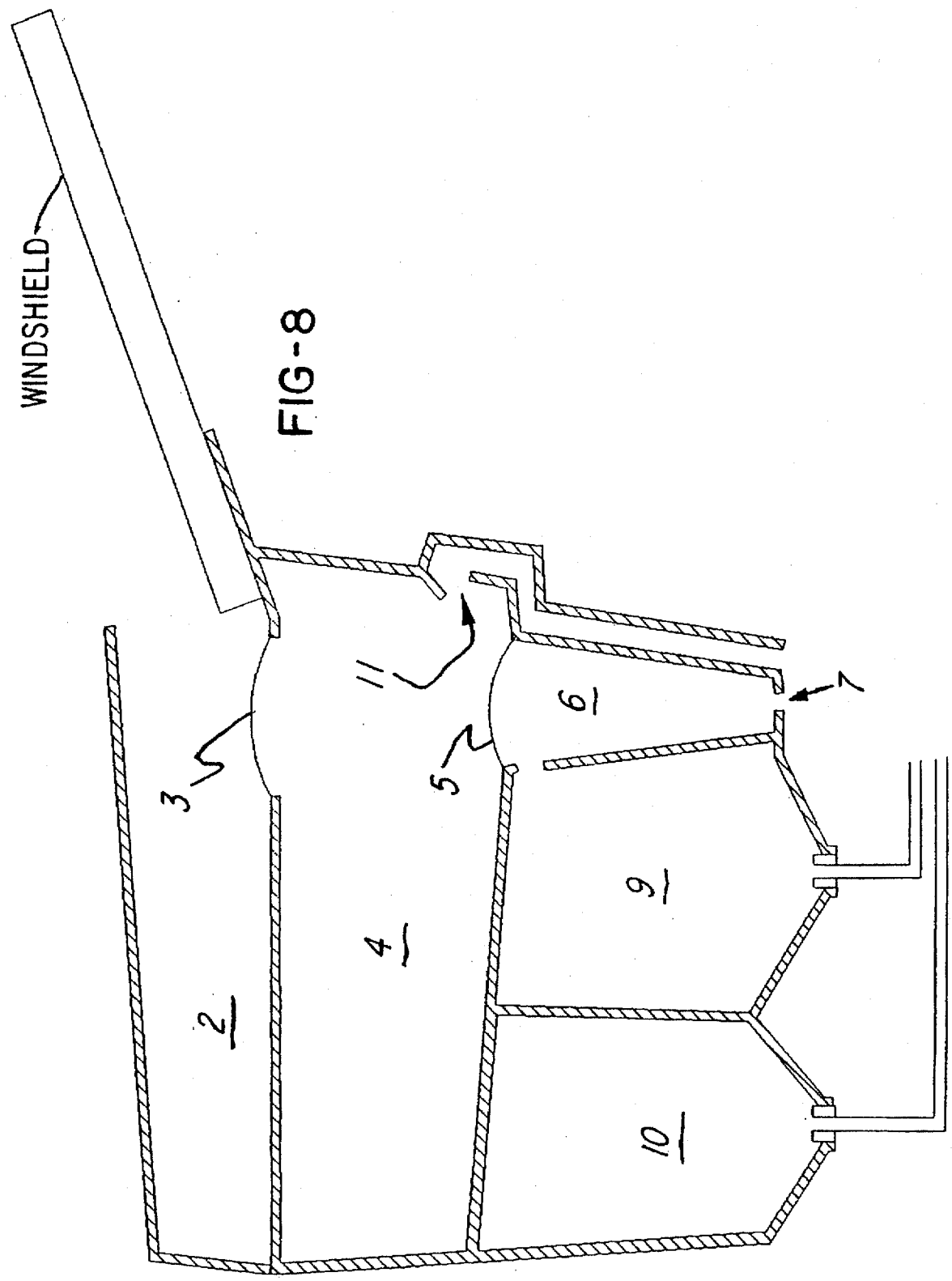
FIG. 8 illustrates a different embodiment of cap C in FIG. 6.

4. An entry plenum 2, shown in FIG. 8, can be provided. The hood of the vehicle provides part of the containment surfaces of the entry plenum.

5. In the passive embodiment of FIGS. 1–3, two scenarios are relevant. One is a light rain, as in FIG. 2, wherein sump 6 never becomes filled, and wherein reservoir 9 never becomes filled. Nevertheless, this light rain may be sufficient to completely flush contaminants from the collection surfaces, so that, ultimately, the rain collecting within sump 6 becomes acceptably contaminant-free. The invention tolerates the non-collection of this usable rainwater.

The second scenario is a heavy rain, which rapidly fills sump 6. The system is designed such that the rainwater contained in the sump 6 when it become full, plus that which was previously dumped, is sufficient to clean the collection surfaces.

6. Simple experimentation will demonstrate how to size the bleed aperture 7 in FIG. 1. Some calculations derived by the Inventors will now be given, which will assist this sizing.

Figure 9:
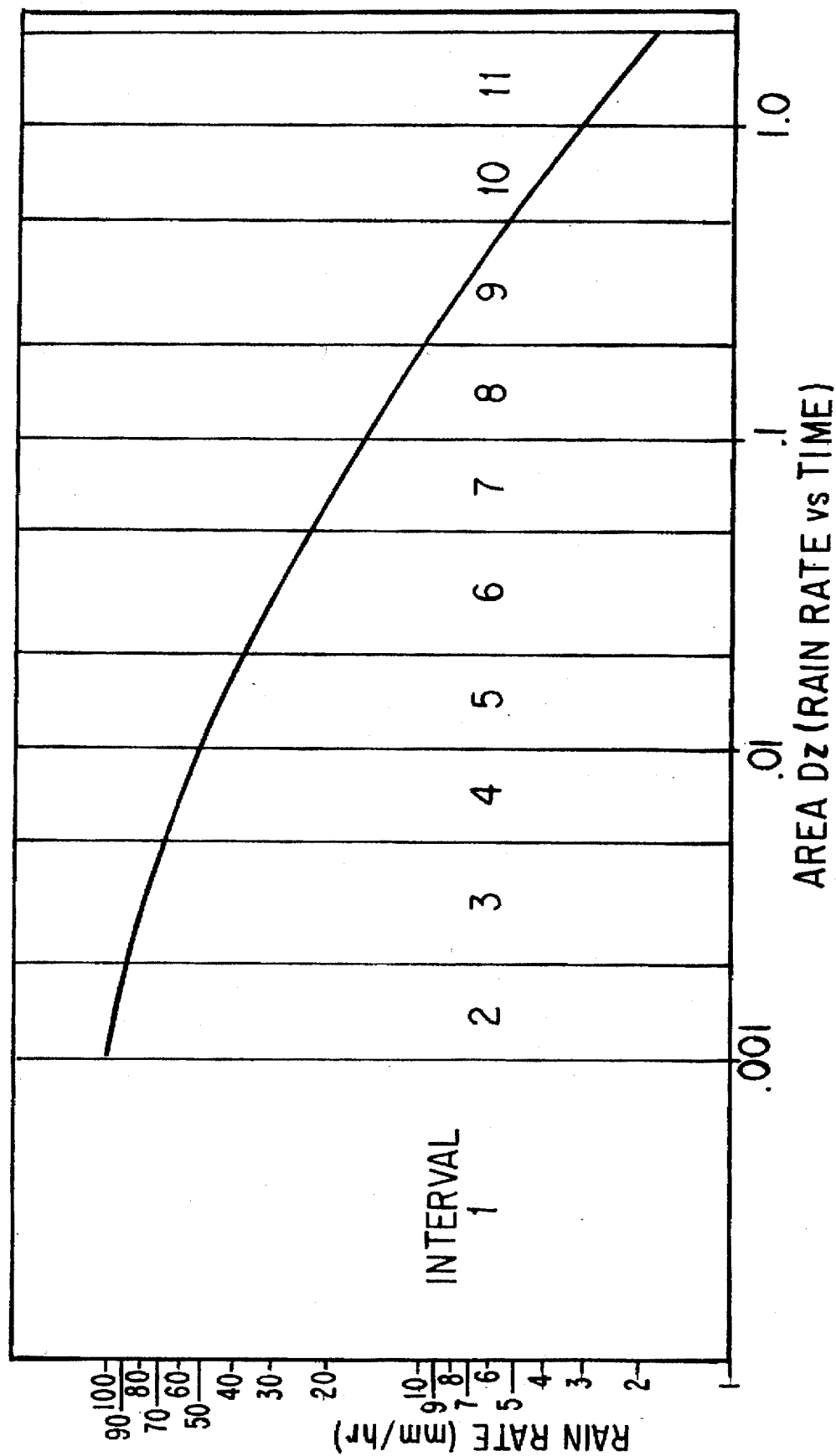
FIG. 9 is an empirical plot of rate of rainwater vs. percent of time each rate occurs.

FIG. 9 is a plot of rain accumulation against the percent of time that each accumulation occurs. Eleven INTERVALS are designated. This plot was derived from "Prediction of Attenuation by Rain," by Crane, *IEEE Transactions on Communications*, vol. 28, no. 9, pp. 1721–23.

FIGS. 10A and 10B show computations made for each INTERVAL in FIG. 9. Of primary interest are those of FIG. 10B, which shows different amounts accumulated in the reservoir 9 of FIG. 1, for different sizes of the bleed orifice 7. (The amounts bypassed, identified in the headings of FIGS. 10A and 10B, refer to the amounts dumped overboard by the bleed orifice 7.)

Figure 11:
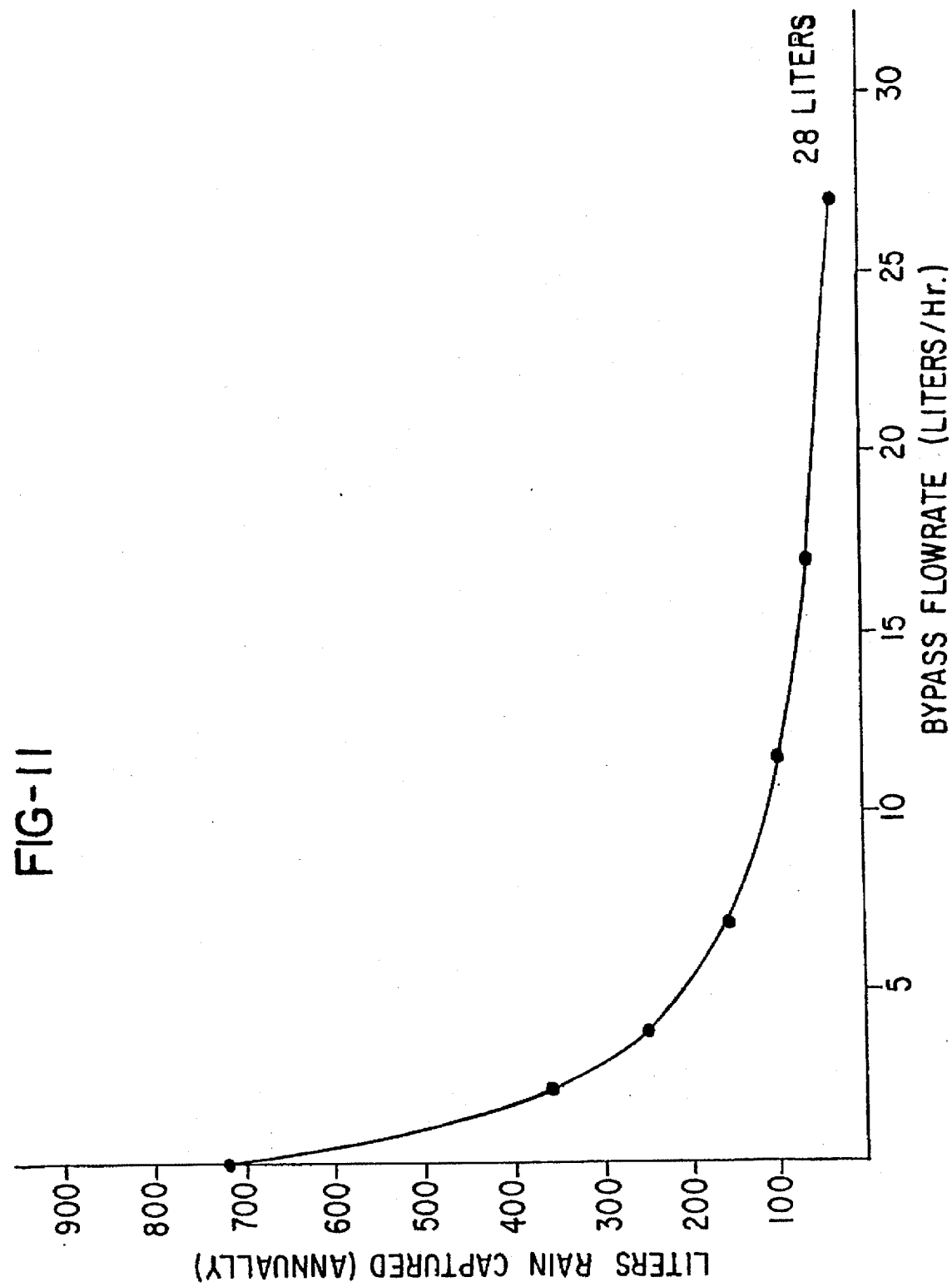
FIG. 11 is a computed plot of water captured vs. bypass flow rate, which is the flow rate through aperture 7 in FIGS. 1–3.

FIG. 11 is a plot of predicted rain captured annually, as a function of bypass flow rate. FIG. 11 presumes that the WINDSHIELD in FIG. 1 has an area of one square meter, set at an angle of 40 degrees above horozontal, thus providing a projected frontal area of 0.766 square meter.

FIG. 12 provides flow rates for bleed apertures 7 of various diameters, and for various sump depths.

7. The two fluids contained in reservoirs 9 and 10 in FIGS. 1–3 should not be confused. Reservoir 9 contains water. Water is a solvent.

Reservoir 10 contains a detergent, or concentrated windshield washing fluid, which is commonly also called "solvent," and is probably a water-based solution.

Despite the fact that both reservoirs contain water, which is a solvent, a primary difference is that the fluid contained in reservoir 9 is primarily water. Reservoir 9 will certainly contain over 90 percent, by weight, of water. This percentage will probably exceed 95 per cent, and may even exceed 99 percent.

In contrast, reservoir 10 will contain a detergent-water solution.

8. A vehicle has been discussed herein. The primary type of vehicle under consideration is a motordriven, wheeled vehicle, such as an automobile or truck.

Numerous substitutions and modifications can be undertaken without departing from the true spirit and scope of the invention. What is desired to be secured by Letters Patent is the invention as defined in the following claims.

We claim:

1. A method of replenishing rainwater in a reservoir in a windshield washing system of a vehicle, said system comprising a plurality of surfaces, said method comprising the following steps:

a) providing said plurality of surfaces to capture rainwater;
   b) flushing contaminants from said plurality of surfaces, using rainwater;
   c) bleeding the flushed contaiminants from the windshield washing system using the fluid director; and
   d) after flushing and bleeding, capturing rainwater in the reservoir, using said fluid director.

2. In a windshield washing system for a vehicle, said system comprising a reservoir, a rainwater collector, and means for delivering fluid from said reservoir to a windshield, the improvement comprising:

a sump disposed between, and in fluid communication with, the rainwater collector and the reservoir, said sump having a bleed orifice located below both a sump inlet connected to the rain water collector and a sump outlet connected to the reservoir such that said sump:
   i) fills only when the rate of incoming rainwater flowing through said sump inlet exceeds the rate of rainwater exiting through said bleed orifice; and
   ii) delivers water through said sump outlet to said reservoir after becoming filled.

3. A system for collecting and treating rainwater for use in a windshield washing device of a vehicle, comprising:

a) means for collecting rainwater from a windshield;
   b) a first reservoir;
   c) sump means for:
      i) bleeding an initial stream of collected rainwater from the system, and subsequently
      ii) delivering rainwater to the first reservoir, if sufficient water is received by the sump means, said sump means in fluid communication with both said means for collecting and said first reservoir; and
   d) a second reservoir in fluid communication with said first reservoir for holding detergent.

* * * * *

UNITED STATES PATENT AND TRADEMARK OFFICE
CERTIFICATE OF CORRECTION

PATENT NO.  : 5,669,986
DATED       : September 23, 1997
INVENTOR(S) : Buchanan, Jr. et al.

It is certified that error appears in the above-identified patent and that said Letters Patent is hereby corrected as shown below:

```
Column 5, line 5, claim 1, after "said", please insert
--windshield washing--.

Column 5, line 13, claim 1, please delete "the" and insert
--a-- therefor.

Column 5, line 17, claim 2, after "said", please insert
--windshield washing--.
```

Signed and Sealed this

Sixth Day of July, 1999

Attest:

Q. TODD DICKINSON

*Attesting Officer*    Acting Commissioner of Patents and Trademarks